United States Patent
Mestha

(10) Patent No.: US 8,150,153 B2
(45) Date of Patent: Apr. 3, 2012

(54) RAY-BASED COMPRESSION MAPPING IN A COLOR MANAGEMENT SYSTEM

(75) Inventor: Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 560 days.

(21) Appl. No.: 12/391,473

(22) Filed: Feb. 24, 2009

(65) Prior Publication Data

US 2010/0215262 A1    Aug. 26, 2010

(51) Int. Cl.
*G06K 9/00* (2006.01)
(52) U.S. Cl. .................................. 382/166; 358/518
(58) Field of Classification Search .......... 382/162–167, 382/276–277, 1.9, 518, 525; 358/1.9, 518, 358/525
See application file for complete search history.

(56) References Cited

U.S. PATENT DOCUMENTS

| | | | |
|---|---|---|---|
| 6,157,469 A | 12/2000 | Mestha | |
| 6,724,500 B1 * | 4/2004 | Hains et al. | 358/1.9 |
| 6,744,531 B1 | 6/2004 | Mestha et al. | |
| 7,397,581 B2 | 7/2008 | Mestha et al. | |

OTHER PUBLICATIONS

Cholewo, et al., Gamut Boundary Determination Using Alpha-Shapes, *Proceedings of the 7th Color Imaging Conference*, Scottsdale, Arizona, 1999, 5 pages, Lexmark International, Inc., Lexington, KY, USA.
Braun, et al., "Techniques for Gamut Surface Definition and Visualization," *IS&T/SD fifth Color Imaging Conference: Color Science, Systems and Applications (including CD)*, Scottsdale, Arizona, Nov. 1997; Abstract, 1 page.
Mestha, et al., "Gray Balance Control Loop for Digital Color Printing Systems," *Imaging Science & Technology NIP21: International Conference on Digital Printing Technologies*, vol. 21, pp. 499-504, Baltimore, MD (Sep. 2005), ISBN/ISSN: 0-89208-257-7.

* cited by examiner

*Primary Examiner* — Duy M Dang
(74) *Attorney, Agent, or Firm* — Philip E. Blair; Fleit Gibbons Gutman Bongini & Bianco P.L.

(57) ABSTRACT

What is disclosed is a novel system and method for performing ray-based compression mapping in a color management system. The present method compresses a color point located at or near a boundary surface of a color gamut to a point beneath the gamut surface in order to eliminate artifacts which are likely to arise from a color marking device trying to reproduce colors which are on a boundary of the device's printable gamut. The present method is directly applicable to a variety of gamut mapping strategies employed in color management systems.

21 Claims, 12 Drawing Sheets

RAY-BASED COMPRESSION MAPPING IN A COLOR MANAGEMENT SYSTEM

CROSS REFERENCE TO RELATED APPLICATION

The present patent application is related to co-pending and commonly owned U.S. patent application Ser. No. 12/391,504, entitled "Mapping An Out-Of-Gamut Color To A Surface Of A Color Gamut", filed concurrently herewith.

TECHNICAL FIELD

The present invention is directed to methods for performing compression mapping in a color management system performing a gamut mapping function.

BACKGROUND

In digital imaging systems, color management is the controlled conversion between the color representations of various devices, such as image scanners, digital cameras, monitors, TV screens, film printers, computer printers, offset presses, corresponding media, and the like. One primary goal of a color management system is to effectively deal with colors that cannot be reproduced on a target marking device. Gamut mapping algorithms map received color values of an input image to the target gamut of a color output device such that the rendered output colors remain visually consistent with the original image. There is no common method for this process. Performance often depends on the capability of the color mapping methods employed in the color management system.

Color management systems utilize various gamut mapping methods to achieve desired color mapping results. Such systems give experienced users a greater degree of control of the gamut mapping behavior. Color mapping functions adjust the numerical color values that are sent to, or received from, different image output devices so that the perceived colors they produce remain consistent. Since different devices often don't have the exact same color gamut, their colors need rearrangement. This is particular troublesome near the borders of the gamut where colors need to be shifted further to regions inside the boundary surface of the gamut as colors at the gamut boundary may not be accurately represented on the output device and thus would be clipped. For instance, attempts to render a mostly saturated blue from a monitor to a typical output CMYK printer will likely fail because the paper blue will simply not be as saturated as produced by the display. Consequently, the rendered output print of the source image may not look like quite what had been displayed on the color monitor. Compression mapping functions are employed which shift color points at or near a boundary surface of the gamut to a point further within the gamut to avoid the introduction of artifacts.

Accordingly, what is needed are increasingly sophisticated systems and method for performing compression mapping in a color management system.

BRIEF SUMMARY

What is disclosed is a novel system and method for performing ray-based compression mapping in a color management system. The present method compresses a point located at or near a boundary surface of a color gamut to a point beneath the gamut surface in order to eliminate artifacts which may arise from a color marking device trying to reproduce colors which are on a boundary of the device's printable gamut. The present method is directly applicable to a variety of gamut mapping strategies employed in color management systems performing a gamut mapping function.

In one example embodiment, the present method for ray-based compression mapping in a gamut mapping function involves performing the following. A first color point $x_b$ in L*a*b* space is identified which is at a surface of a color gamut. The surface point can be identified using the above described iterative method for mapping an out-of-gamut color to a surface of a color gamut. A second color point $x_0$ in L*a*b* space is identified which is inside the boundary of the surface of the color gamut. A ray, defined as a line between color points $x_b$ and $x_0$, is formed. The ray intersects the boundary surface of the gamut at intersection point $x_b$. An amount of compression to be applied to the gamut is determined. A point $x_p$ along the ray between points $x_b$ and $x_0$ is identified which is a distance from intersection point $x_b$ defined by the amount of a compression to be applied. The ray, between $x_b$ and $x_p$, is then divided into a plurality of discrete points $x_i$, each having coordinates $\{L^*_i, a^*_i, b^*_i\}$ in L*a*b* space where i is an index of a current point. Then, a piece-wise linear function is used to move each point between $x_b$ and $x_p$, to a new point along the ray between $x_p$ and $x_0$. Each successive point between $x_b$ and $x_p$ is moved a distance which is less than the distance the previous point was moved. An example piece-wise linear function is provided herein. The piece-wise linear function can be further smoothed using a 1D smoothing algorithm. Other embodiments have been provided.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
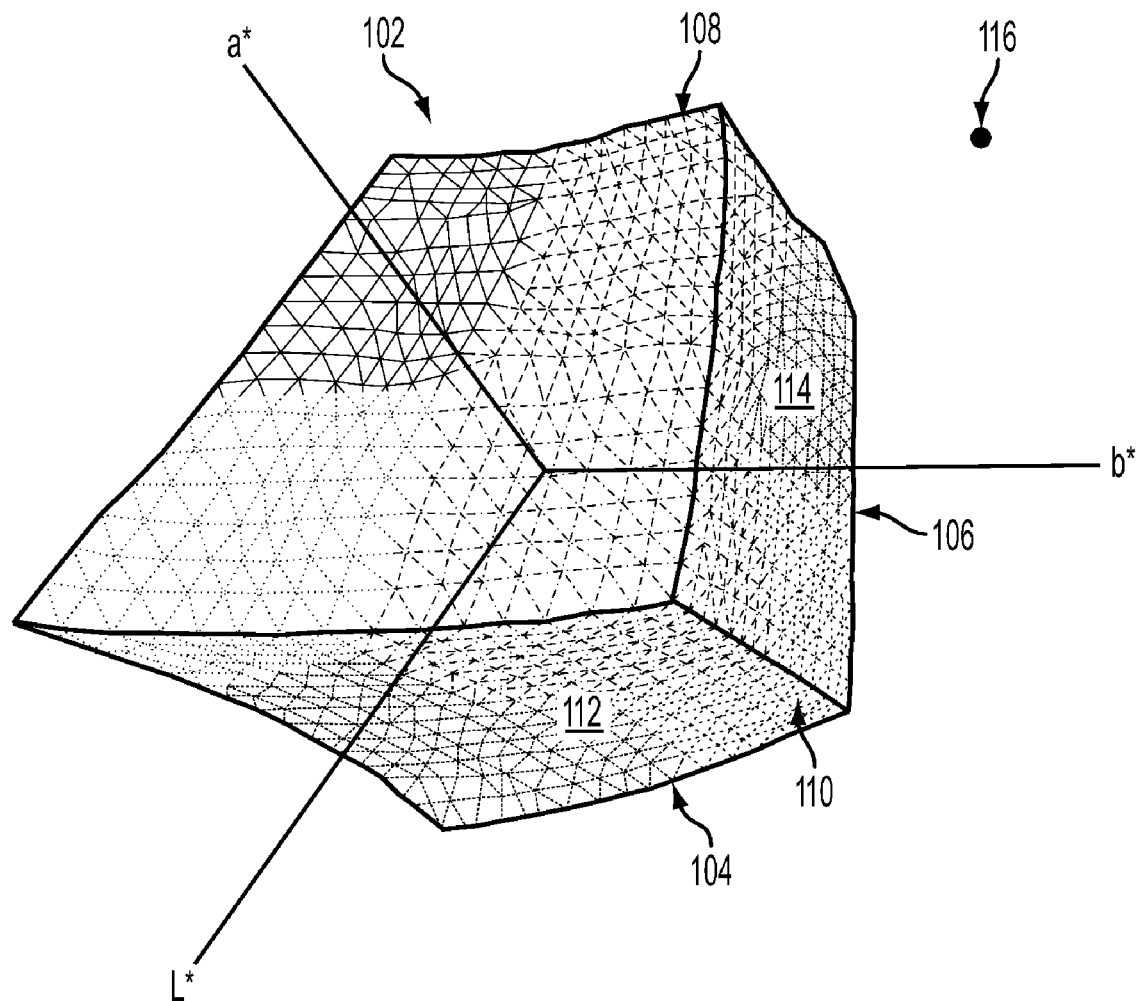
FIG. 1 illustrates an example color space of an example generic CMYK printer gamut.

What is provided is a system and method which maps an out-of-gamut spot color to a surface boundary of a target color gamut of a color marking device in a color management system. The present method accurately detects the intersection of a point at the boundary surface of a ray traced between the out-of-gamut color and color point along a neutral axis of the target gamut.

It should be understood that one of ordinary skill in this art would be readily familiar with many facets of color science such as, but not limited to, color space, color gamuts, gamut mapping, and other related techniques and algorithms commonly found in the color science arts such as, for instance, color management, device color characterization, digital halftoning, image compression, color quantization, gamut mapping, computationally efficient transform algorithms, and color image processing. Those of ordinary skill would be familiar with the text: "*Digital Color Imaging Handbook*", 1$^{st}$ Ed. CRC Press (2003), ISBN-10: 084930900X, ISBN-13: 978-0849309007, which is incorporated herein in its entirety by reference. Additionally, one of ordinary skill would also be familiar with advanced mathematical techniques used for color manipulation and various color transformation processes. One of ordinary skill would be knowledgeable about computer science and software and hardware programming systems and methods sufficient to implement the functionality and capabilities described herein in their own computing environments without undue experimentation.

A Lab color space is a color-opponent space with dimension L* for luminance and a and b for the color-opponent dimensions based on non-linearly compressed CIE XYZ color space coordinates. Lab color space is more often used as an informal abbreviation for the CIE 1976 L*a*b* color space (also called CIELAB), whose coordinates are given by {L*, a*, b*}. Chrominance (a) is the chrominance of a first channel. Chrominance (b) is the chrominance of a second channel. Luminance (L) is a photometric quantity which, in essence, is the effect of radiance on our eyes. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Brightness is the subjective visual experience of luminance, i.e., the effect of luminance on the brain. Primary colors are understood to be Cyan, Magenta, Yellow, and Black. Secondary colors are understood to be Red, Green, and Blue.

The gamut refers to a complete subset of colors as defined by the spectrum of light, i.e., the distribution of light energy versus wavelength, interacting with the spectral sensitivities of the eye's light receptors and the colorants on the substrate. One of the common usages refers to the subset of colors which can be accurately represented in a given circumstance, such as within a given color space or by a certain output device. Another refers to the set of colors found within an image at a given time. In this context, digitizing a photograph, converting a digitized image to a different color space, or outputting it to a given medium using a certain output device generally alters its gamut, in the sense that some of the colors in the original are lost in the transformation process. A color transformation process translates an input color space to an output color space. In conventional color management systems, a color transformation converts each input color space to an output target color space using mathematical algorithms. The mathematical algorithms of the color profiles for a color transformation may be convolved to produce a single mathematical algorithm for increased efficiency. The gamut of a color marking device, for example, is a multi-dimensional color space having a given volume with the axes of the space being defined by the pigments used in the colorants of the primary colors. Each of the primary colors is transferred to the image-receiving medium. The color gamut is defined by the interaction of the primary colors, and is limited by an amount of toner that can be deposited on the image-receiving medium.

An image processing system refers to a hardware or software system capable of processing an image for output to an image output device. Such a system may include in a color management system placed in the image path of a document reproduction system.

An image output device refers to a device capable of reducing a signal of an image to viewable form. The set of such devices includes printers, xerographic devices, image production and photographic equipment, monitors and other display devices, and the like. Outputting the image means communicating information about the image to an image output device. Such communication may take the form of transmitting the image in the form of signals over a network or other communication pathway, or storing the signals to a memory or storage media for subsequent retrieval. A color marking device, such as an inkjet printer, is one example of an image output device which produces an image from the received signal onto a substrate by the visual integration of colored inks deposited thereon.

The present ray-based method maps an out-of-gamut color to a boundary surface of a color gamut. One example color gamut is shown in FIG. 1. Although shown in black and white, it should be appreciated that the illustrated gamut is a color gamut of a target color marking device composed of a plurality of different colored regions.

Reference is now made to FIG. 1. The color gamut comprises a color space 102 which includes 14 corners, 24 edges, and 12 faces. The color spaces has a first edge 104, a second edge 106, a third edge 108 and a fourth edge 110 along a first face 112 and a second face 114. Point 116 is a point outside the boundary of the surface of the gamut which will be mapped to a point on the surface of the gamut using the present method. The gamut is defined in L*a*b* color space by a set of axes. One axis is given in L*, another in a*, and another in b*. Each point $x_i$ is defined by a set of coordinates given by $\{L^*_i, a^*_i, b^*_i\}$. One point $x_0$ might be defined by, for example, coordinates $\{L^*_0=20, a^*_0=0, b^*_0=0\}$ and point $x_c$ might be defined by, for example, coordinates $\{L^*_c=80, a^*_c=50, b^*_c=30\}$.

Figure 2:
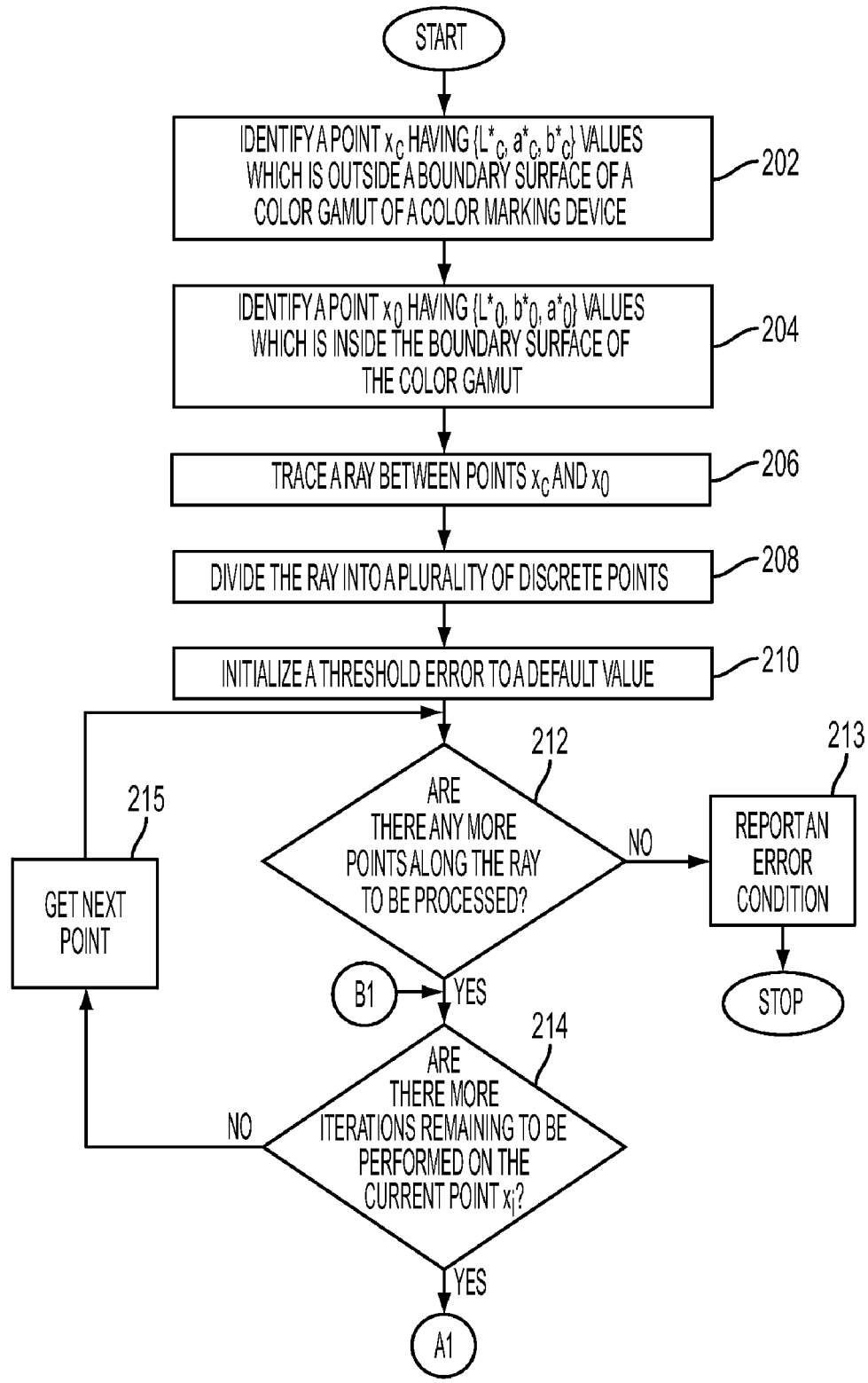
FIG. 2 is a flow diagram of one example embodiment of the present ray-based method for mapping an out-of-gamut color to a surface boundary of a color gamut of a target color marking device.
Figure 4:
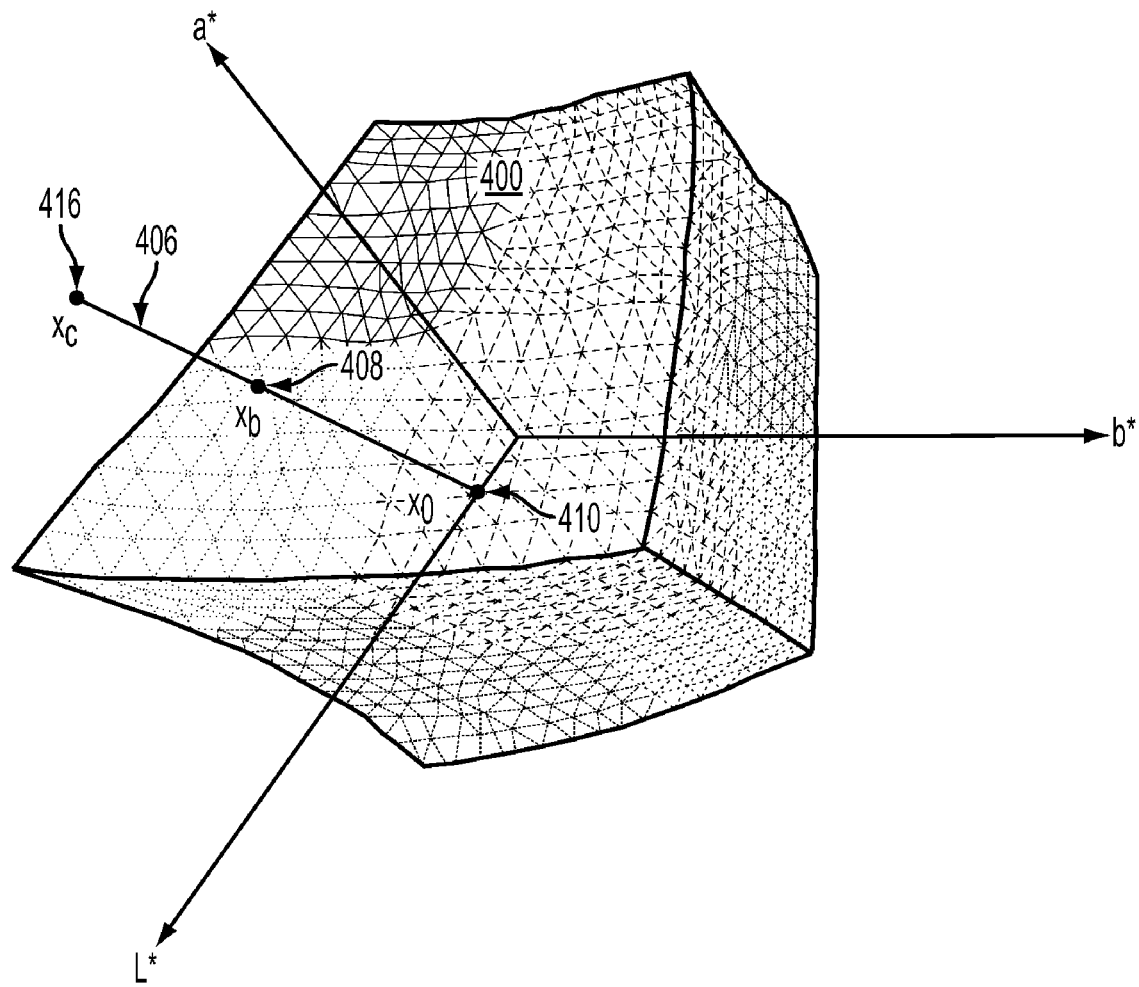
FIG. 4 illustrates the example gamut of FIG. 1 with a ray traced between $x_c$ and $x_0$ and intersecting the surface of the gamut at $x_b$.

Reference is now being made to FIG. 2 which illustrates one example of a flow diagram of one embodiment of the present ray-based method for mapping an out-of-gamut color to a surface boundary of a color gamut of a target color marking device. Reference is also concurrently made to FIGS. 4-6.

For explanatory purposes, the example embodiment discussed is described with respect to 4-color (CMYK) separations. It should be understood that the present method is equally applicable to a device capable of 3-color (CMY) separations. Alternatively, the present method applies to a device having N-color separations, where N>4. For example, if N=6 the colors may include: Cyan, Magenta, Yellow, Black, Orange, and Violet. Other N-color separations of various devices are intended to fall within the scope of the appended claims.

At 202, a point $x_c$ in L*a*b* space is identified which is outside a boundary of a surface of a color gamut of the target color marking device. Point $x_c$ has $\{L_c, a^*_c, b^*_c\}$ values. One example point $x_c$ which is outside the boundary surface of gamut 400 is shown at 416 of FIG. 4. One method for determining whether a given color is inside or outside the boundary surface of a target color gamut is disclosed in U.S. Pat. No. 8,103,092 entitled: "Determining Whether a Color is Inside or Outside a Boundary Surface of a Color Gamut", which is incorporated herein in its entirety by reference.

At 204, a point $x_0$ in L*a*b* space is identified which is inside the boundary of a surface of the color gamut of the target color marking device. Point $x_0$ has $\{L_0, a^*_0, b^*_0\}$ values. One example point $x_0$ at 410 of FIG. 4. In one embodiment, point $x_0$ is a point along a neutral axis of the gamut having coordinates $\{L^*, a^*=0, b^*=0\}$, where L* is between 0 and 100, inclusive. In one embodiment, point $x_0$ is a point along a neutral axis of the gamut having coordinates $\{L^*, a^*=0, b^*=0\}$, where L* is between the minimum L* of the printer and 100 if we are working with relative to paper values, inclusive. Otherwise, the value 100 needs to be changed to the white point of the paper.

At 206, a ray is traced between points $x_c$ and $x_0$. An example ray is shown at 406 of FIG. 4. The ray 406 intersects the boundary surface of gamut 400 at intersection point $x_b$ at 408. A ray traced between two points can be defined as a line given by:

$$x = x_0 + mi,$$

$$x = \begin{bmatrix} L_i \\ a_i \\ b_i \end{bmatrix}, x_0 = \begin{bmatrix} L_0 \\ a_0 \\ b_0 \end{bmatrix}, m = \frac{1}{N}\begin{bmatrix} L_c - L_0 \\ a_c - a_0 \\ b_c - b_0 \end{bmatrix},$$

where m is the slope, and N is the number of points such that, for i=0 to N, a total of N+1 points are defined along the ray, each of the defined points having color values represented by point $x_i$. A GCR (Gray Component Replacement) LUT can be used to extract the nominal CMYK values for a given point x.

Figure 5:
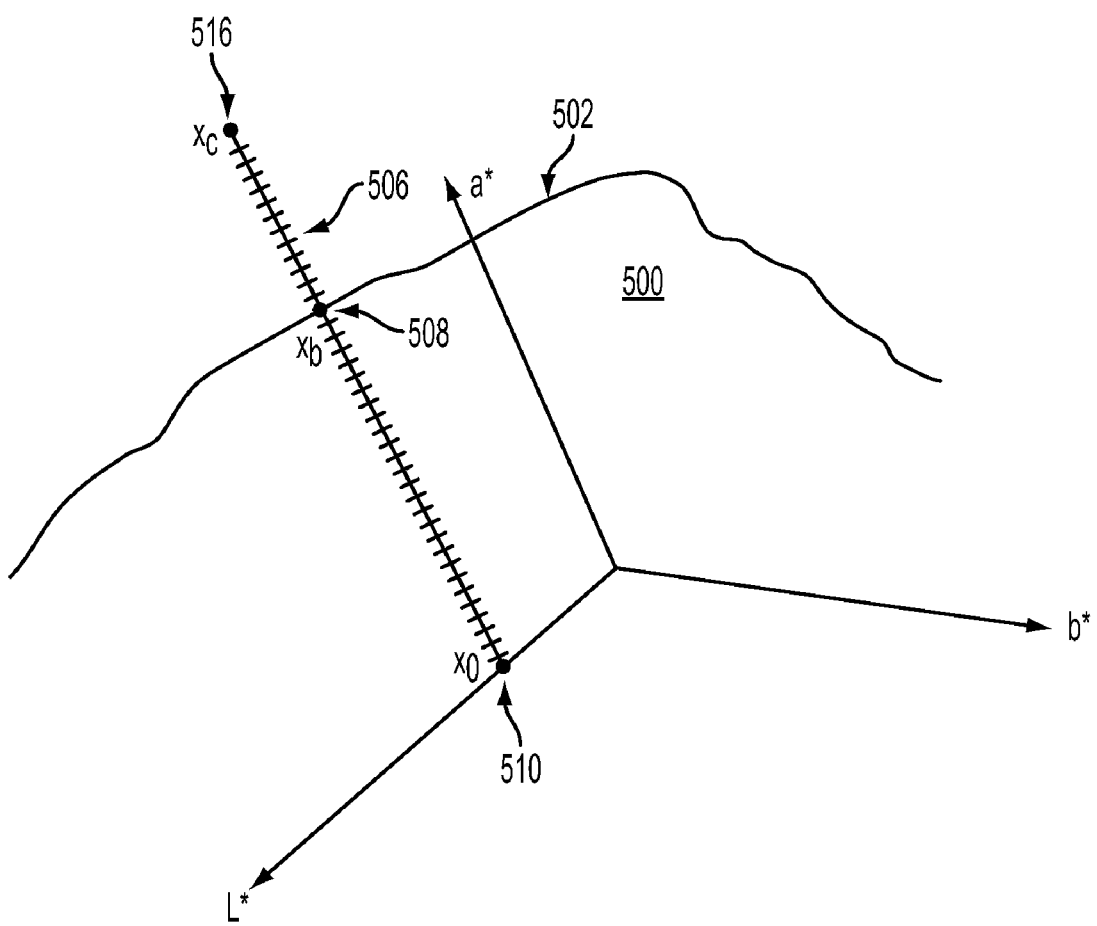
FIG. 5 illustrates an example ray traced between points $x_c$ and $x_0$ having been divided into a plurality of points $x_i$.
Figure 6:
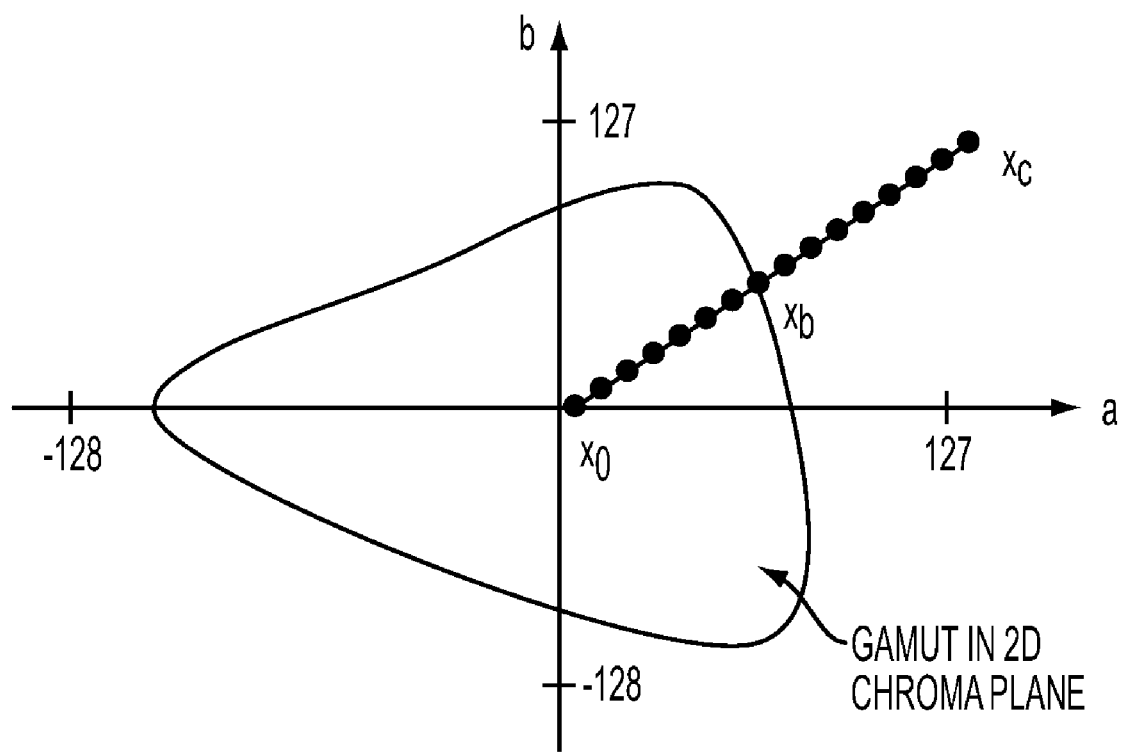
FIG. 6 illustrates an example ray traced between points $x_c$ and $x_0$ having been divided into a plurality of points $x_i$ in a 2D chroma plane of a gamut.

At 208, the ray is divided into discrete points. Each discrete point has $\{L^*_i, a^*_i, b^*_i\}$ values, where i is an index of the current point $x_i$. One hundred discrete color points should be sufficient. The number of points will depend on the processing power of the computing environment wherein the present method is implemented. One example ray 506 of FIG. 5 is shown divided into a plurality of discrete points. The ray intersects the boundary surface 502 of gamut 500 at intersection point $x_b$ at 508. The endpoint $x_0$ 510 is a point along the neutral axis where a*=0 and b*=0 and L* is a value between the L* min of the printer and 100 if we are working with relative to paper values, inclusive. Otherwise, the value 100 needs to be changed to the white point of the paper. FIG. 6 illustrates another example ray traced between points $x_c$ and $x_0$ which has been divided into a plurality of points and which intersects the 2D chroma plane at intersection point $x_b$. The endpoint $x_0$ of the ray of FIG. 6 is at a point along the axis where a*=0 and b*=0.

At 210, a threshold error is initialized to a default value. The threshold error value is used herein to detect an intersection of the gamut surface. This threshold should be sufficiently low. If the present method is used directly by iterating on the color marking device (as opposed to iterating on a model of the device) then the value of the threshold error may be increased in order to account for noise in the system. Once the threshold error value has been pre-set, the following are repeated until the intersection of the ray with the surface of the gamut has been detected. It should be appreciated that if the starting point of the ray is outside the boundary surface of the gamut and the endpoint is within the boundary surface of the gamut then the ray will intersect with the surface boundary at some point.

At 212, a determination is made whether any more points $x_i$ along the ray remain to be processed. If not then an error condition 213 has occurred and processing stops. Since all points have apparently been processed without the intersection point having been detected, an error condition must have occurred and is preferably reported to the user. This is the outer loop which iterates for all points along the ray. From a programming perspective, the number of iterations in this loop is defined by the number of discrete points along the ray, including the endpoints of the ray.

At 214, a determination is made whether any more iterations remain to be performed on the current point $x_i$. If not then, at 215, the next point along the ray is to be processed and processing proceeds to box 212. Otherwise, processing continues with respect to step 216 of FIG. 3. Essentially, this is the inner loop which iterates for a predefined number of iterations for each discrete point along the ray. From a programming perspective, the number of iterations is a user-defined parameter which defines the number of iterations to be performed on each of the discrete points $x_i$ along the ray. For a common marking device, 10 iterations should be sufficient. This number will depend on the processing power of the computer system wherein the present method is implemented.

Figure 3:
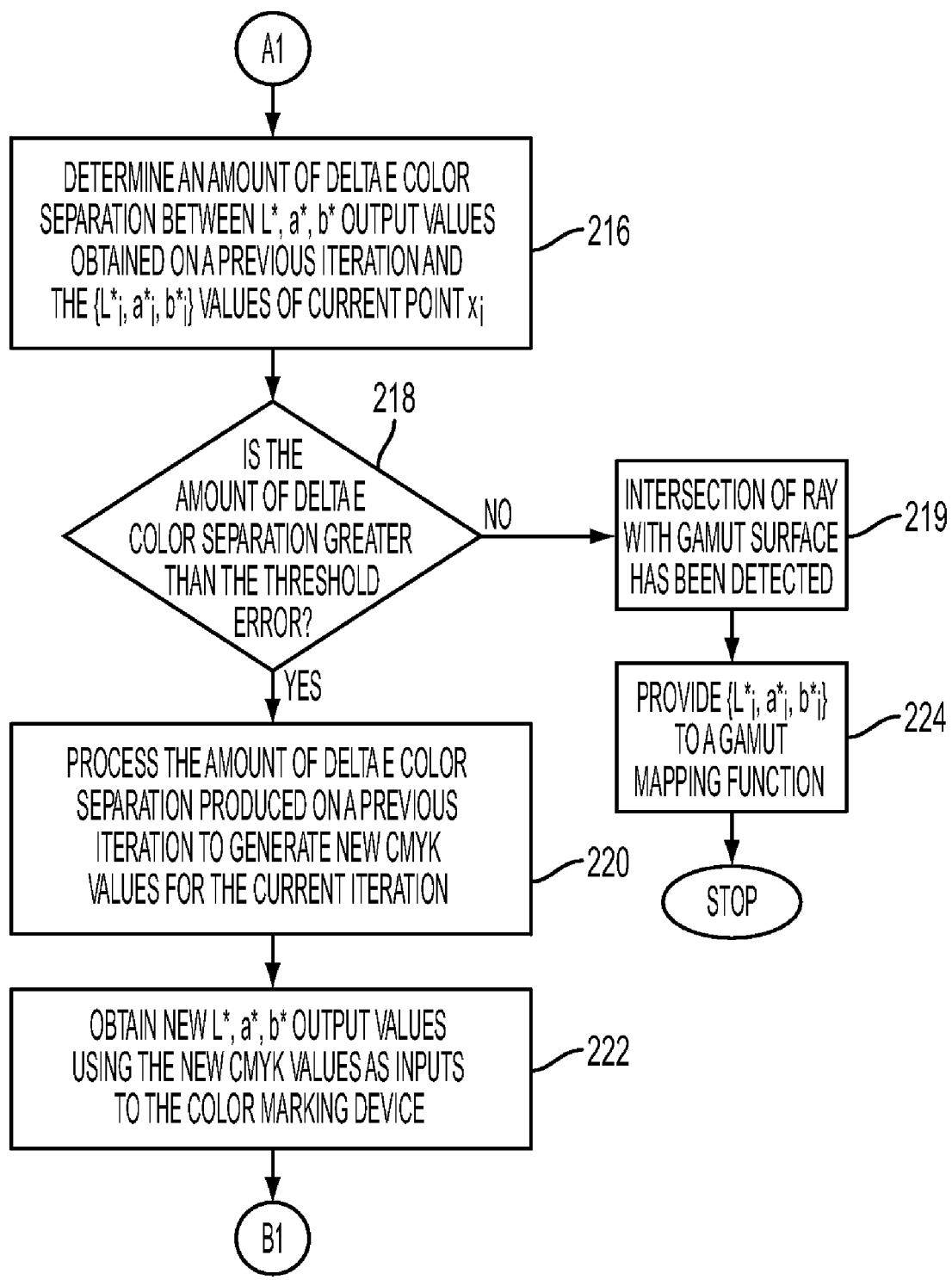
FIG. 3 which is a continuation of the flow diagram of FIG. 2 with flow continuing with respect to node A1.

Reference is now being made to the flow diagram of FIG. 3 which is a continuation of the flow diagram of FIG. 2 with flow continuing with respect to node A1.

At 216, an amount of deltaE color separation is determined between L*a*b* output values obtained on a previous iteration and the $\{L^*_i, a^*_i, b^*_i\}$ values of the current point $x_i$. Methods for determining an amount of deltaE separation between two colors in L*a*b* space are well known and should be readily familiar to one of ordinary skill in this art. See, "Color Technology for Electronic Imaging Devices", Henry R. Kang, SPIE Optical Engineering Press, (1997), ISBN-10: 0819421081, ISBN-13: 978-0819421081, which is incorporated herein in its entirety by reference. Since this is a loop, it should be appreciated that default L*a*b* output values are used on a first iteration for a previous iteration's result.

At 218, a determination is made whether the amount of deltaE color separation is greater than the pre-set threshold error value. Such a determination is the result of a mathematical comparison. In one example embodiment, if the determined amount of deltaE color separation is less than or equal to the pre-set threshold error value then, at 219, the intersection of the ray with the gamut surface has been detected and further iterative processing stops. Upon detection of the intersection point, at 224, the $\{L^*_i, a^*_i, b^*_i\}$ coordinates of the current point $x_i$ is provided to a gamut mapping function. The process ends. It should be understood that the current point $x_i$ is the intersection point $x_b$. Additionally, CMYK values may be computed from the $\{L_b, a^*_b, b^*_b\}$ coordinates of the intersection point $x_b$.

From a programming perspective, stopping further processing upon detection of the intersection of the ray with the gamut surface involves breaking out of the inner loop (iterating a defined number of iterations for the current point) and the outer loop (iterating for each discrete point divided along the ray). Breaking control of inner and outer programming loops is a relatively well known programming technique which should be readily understood by one of ordinary skill.

Otherwise, if the amount of deltaE color separation is greater than the pre-set threshold error then the intersection of the ray with the gamut surface has not yet been detected and processing proceeds according to the following steps.

At 220, the amount of deltaE color separation is processed with CMYK values produced on a previous iteration to generate new CMYK values for the current iteration. Since this is an iterative loop, it should be appreciated that default CMYK values are used on a first iteration for the previous iteration's result. In one embodiment, processing is performed using a feedback controller. One example feedback controller is described in: "Gray Balance Control Loop for Digital Color Printing Systems", L. K. Mestha, R. Enrique Viturro, Yao Rong Wang, Sohail A. Dianat, Imaging Science & Technology NIP21: International Conference on Digital Printing Technologies, Vol. 21, pp. 499-504, Baltimore, Md., (September 2005), ISBN/ISSN: 0-89208-257-7, which is incorporated herein in its entirety by reference. In one embodiment, a feedback control algorithm calculates a difference between the L*a*b* output values and the $\{L^*_i, a^*_i, b^*_i\}$ of the current point $x_i$ to determine an amount of an error value. The determined error value is then multiplied by a gain matrix to obtain a gain weighted error vector. One of ordinary skill in this art would appreciate that the gain matrix employed should be sufficiently stable to avoid oscillations and/or perturbations in a feedback control algorithm. The gain weighted error vector is integrated by an integrator to obtain an integrated error vector. The integrated error vector is then added to the CMYK values obtained from a previous iteration. The addition of the integrated error vector to the previous iteration's CMYK values produces the new CMYK values for the current iteration. A sensitivity matrix can be utilized with the gain matrix. One such method is disclosed in U.S. application Ser. No. 12/024,221 entitled: "Sensitivity Matrix Determination for Adaptive Color Control", which is incorporated herein in its entirety by reference.

At 222, L*a*b* output values are obtained using the newly generated CMYK values as inputs to the color marking device. In one embodiment, the L*a*b* output values are obtained using the color marking device in a manner as follows: First, a test patch of the previous iteration's CMYK values is printed using the color marking device. Color values are then measured for each color printed on the test patch. The measured color values are converted to L*a*b* space to obtain new L*a*b* output values. The L*a*b* output values may also be obtained from an algorithm which models the color marking device in L*a*b* space using the newly generated CMYK values as inputs.

If more iterations remain to be performed on the current point then processing proceeds to node B1 of FIG. 2 wherein further iterations are performed on the current point or the next point is processed.

Additional constraints can be included in the iterations while performing error minimization (i.e., deltaE2000 etc.,) to provide variations to the components such as lightness, L*, chroma, C, and hue, H.

What is also disclosed herein is a system and method for performing ray-based compression mapping. The present method compresses a color point located at or near a boundary surface of a color gamut to a point further beneath the gamut surface. Such a method would be implemented with, or as part of, a gamut mapping function which would move points at or near the boundary surface of the color gamut in order to avoid artifacts which may arise by the rendering of color points which are nearly out of gamut or which are mistakenly reported as being out of gamut.

Figure 7:
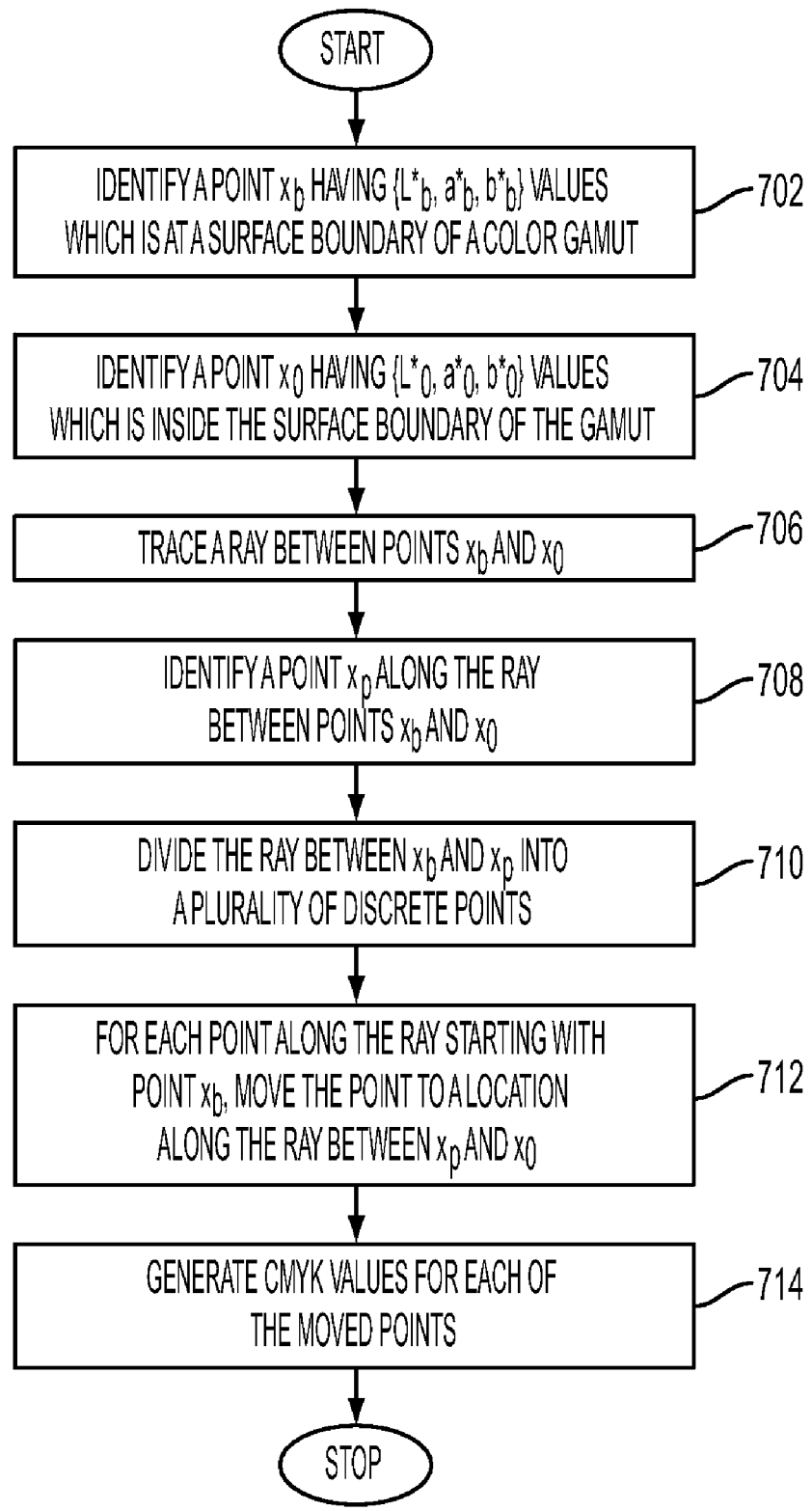
FIG. 7 is a flow diagram of one example embodiment of the present method for ray-based compression mapping in a color management system performing a gamut mapping function.
Figure 8:
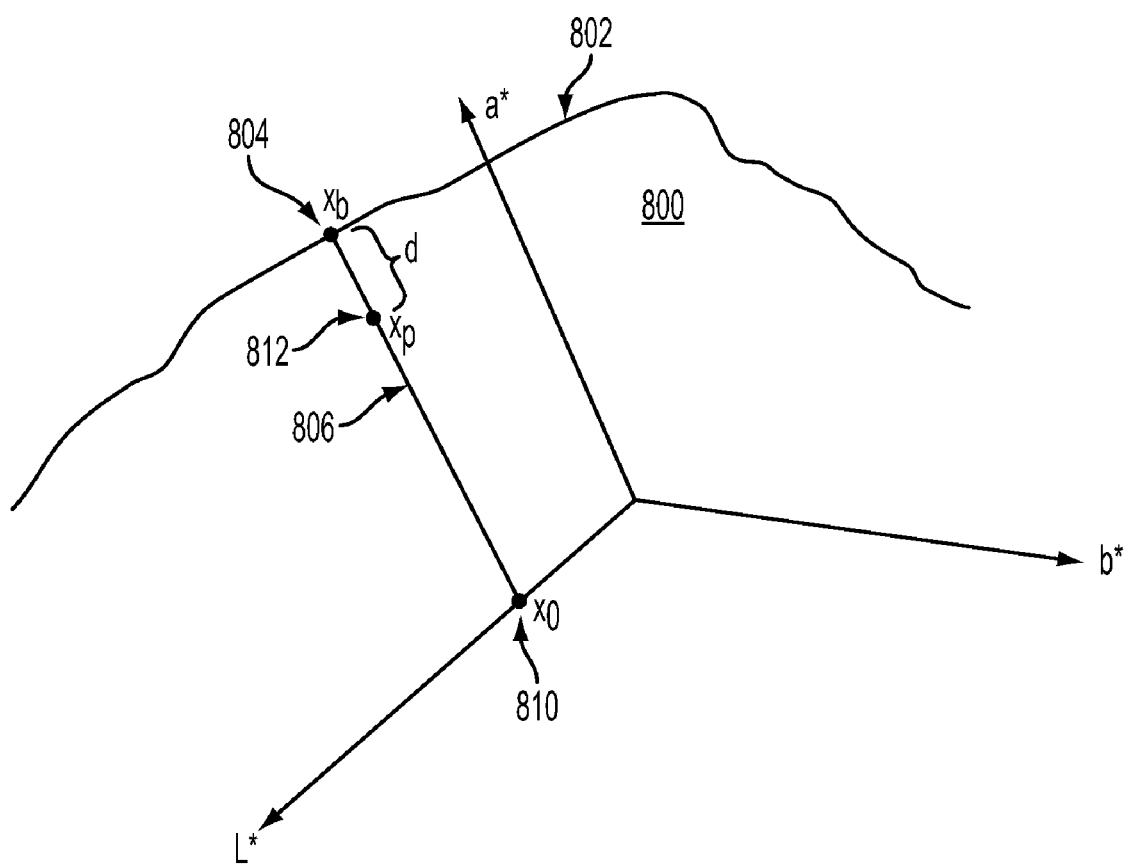
FIG. 8 illustrates an example ray traced between the intersection point $x_b$ and point $x_0$ along a neutral axis of the gamut.

One embodiment of the present method for performing ray-based compression is discussed with respect to the flow diagram of FIG. 7. Reference is also made concurrently to FIGS. 8-10.

At 702, a point $x_b$ in L*a*b* space is identified which is a point at or near a surface boundary of a color gamut. This point has $\{L^*_b, a^*_b, b^*_b\}$ values. One example point which is at or near the surface boundary 802 of gamut 800 is shown at 804 of FIG. 8. One method for mapping a point outside the boundary surface of a color gamut to a point on the surface of the gamut is described above with respect to the flow diagrams of FIGS. 2-3.

At 704, a point $x_0$ in L*a*b* space is identified which is inside the surface boundary of the color gamut. This point has $\{L^*_0, a^*_0, b^*_0\}$ values. In one embodiment, point $x_0$ is a point along a neutral axis of the gamut having coordinates $\{L^*, a^*=0, b^*=0\}$, where L* is between the minimum L* of the printer and 100 if we are working with relative to paper values, inclusive. Otherwise, the value 100 needs to be changed to the white point of the paper. One example point which is inside the surface boundary of the color gamut is shown at 810 of FIG. 8.

At 706, a ray is traced between points $x_b$ and $x_0$. One example ray is shown in at 806 of FIG. 8. The ray intersects the surface of the gamut at intersection point $x_b$ at 804. A ray traced between two points $x_c$ and $x_0$ can be defined as a line given by:

$$x = x_0 + mi,$$

$$x = \begin{bmatrix} L_i \\ a_i \\ b_i \end{bmatrix}, x_0 = \begin{bmatrix} L_0 \\ a_0 \\ b_0 \end{bmatrix}, m = \frac{1}{N}\begin{bmatrix} L_c - L_0 \\ a_c - a_0 \\ b_c - b_0 \end{bmatrix},$$

where m is the slope, and N is the number of points such that, for i=0 to N, a total of N+1 points are defined along the ray, each of the defined points having color values represented by point $x_i$.

At 708, a point $x_p$ is identified between points $x_b$ and $x_0$ along the ray. One example point is shown at 812 of FIG. 8. The point $x_p$ is a distance (d) from point $x_b$ which defines an amount of compression to be applied to the gamut.

Figure 9:
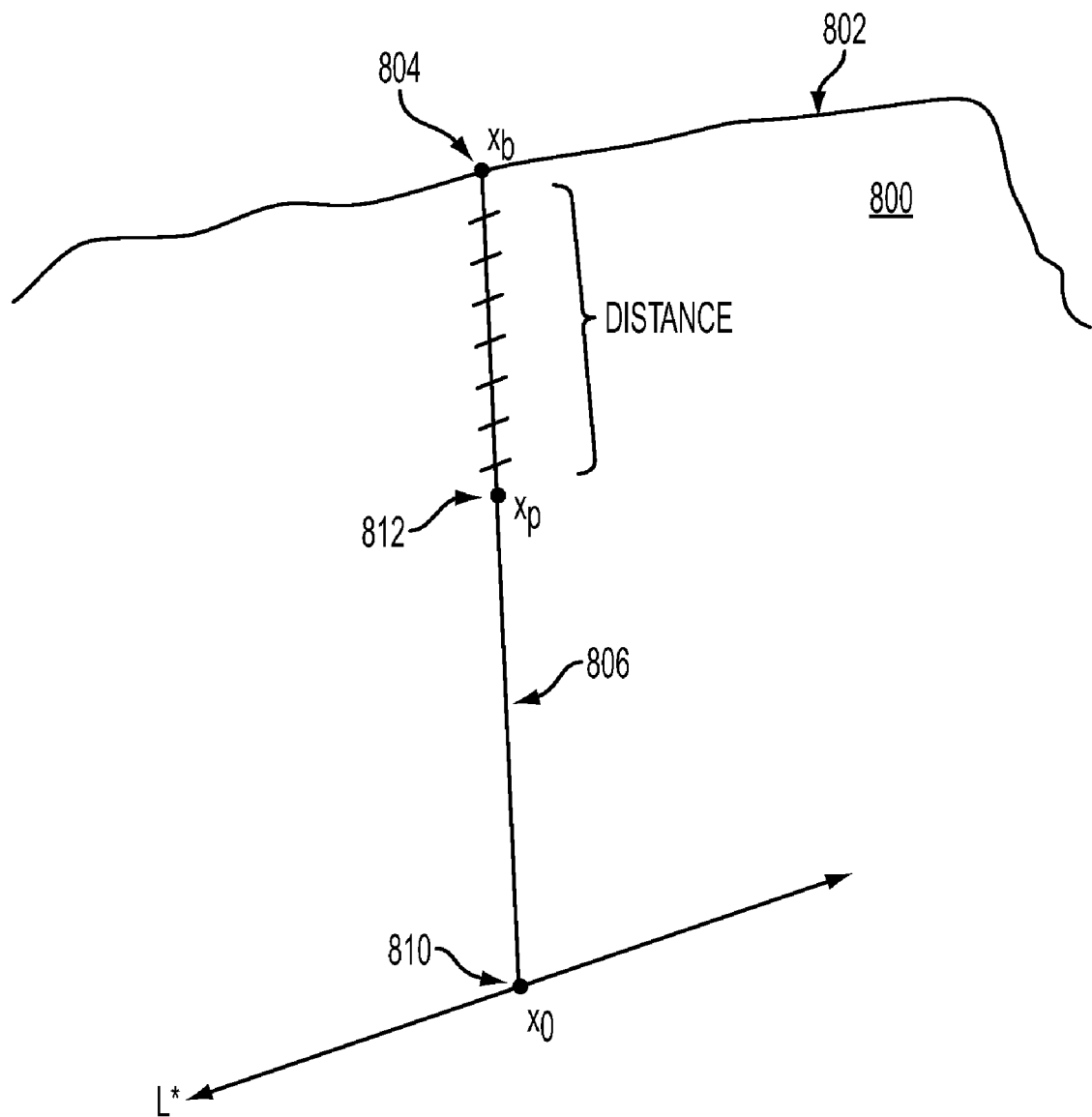
FIG. 9 is an enlargement of the ray of FIG. 8 to show the division of the ray between points $x_b$ and $x_p$ divided into a plurality of discrete points $x_i$.

At 710, the ray between points $x_b$ and $x_p$, is divided into a plurality of discrete points. FIG. 9 is an enlargement of the ray of FIG. 8 to show in greater detail the division of the ray between $x_b$ and $x_p$ into a plurality of discrete points. The points do not have to be equidistance. Each point $x_i$ has coordinates $\{L^*_i, a^*_i, b^*_i\}$ where i is an index of the current discrete point. Point $x_b$ is $x_i$, and the next point down along the ray is $x_{i-1}$, and the next point further down the ray is $x_{i-2}$, and so on until point $x_p$.

At 712, each of the points along the ray (including the intersection point $x_b$) is moved to a point between $x_p$ and $x_0$ along the ray. In one embodiment, a piece-wise linear function is used to move the points along the ray. One example piece-wise linear function is given by:

$$x = (1-\beta)\left[x_0 + \frac{x_b - x_0}{N}i\right] + \beta\left[x_0 + \frac{x_c - x_0}{N}i\right],$$

$$\text{for } 0 \leq i \leq i_b,$$

$$x = (1-\beta)\left[x_0 + \frac{x_b - x_0}{N}i\right] + \beta x_b,$$

$$\text{for } i_b \leq i \leq N,$$

where i is an index such that, for i=0 to N, i=$i_0$ represents point $x_0$ and i=N represents point $x_b$, and where $\beta$ is a compression parameter such that $0 \leq \beta \leq 1$. When $\beta=0$, the interval $\{x_0 \text{ to } x_c\}$ is mapped linearly into $\{x_0 \text{ to } x_b\}$. With $\beta=0$, all colors are moved inward including the in-gamut colors. There is one exception, the colors at $x_c$ are clipped to the boundary. As $\beta$ increases to greater than 0, then the in-gamut colors are compressed less. For $\beta=1$, all in-gamut colors are passed without any compression. All colors greater than $x_b$ are mapped to $x_b$. A 1D smoothing algorithm can be further utilized as described in U.S. Pat. No. 7,397,581 entitled: "TRC Smoothing Algorithm To Improve Image Contours In 3D Color Controls", which is incorporated herein in its entirety by reference.

Figure 10:
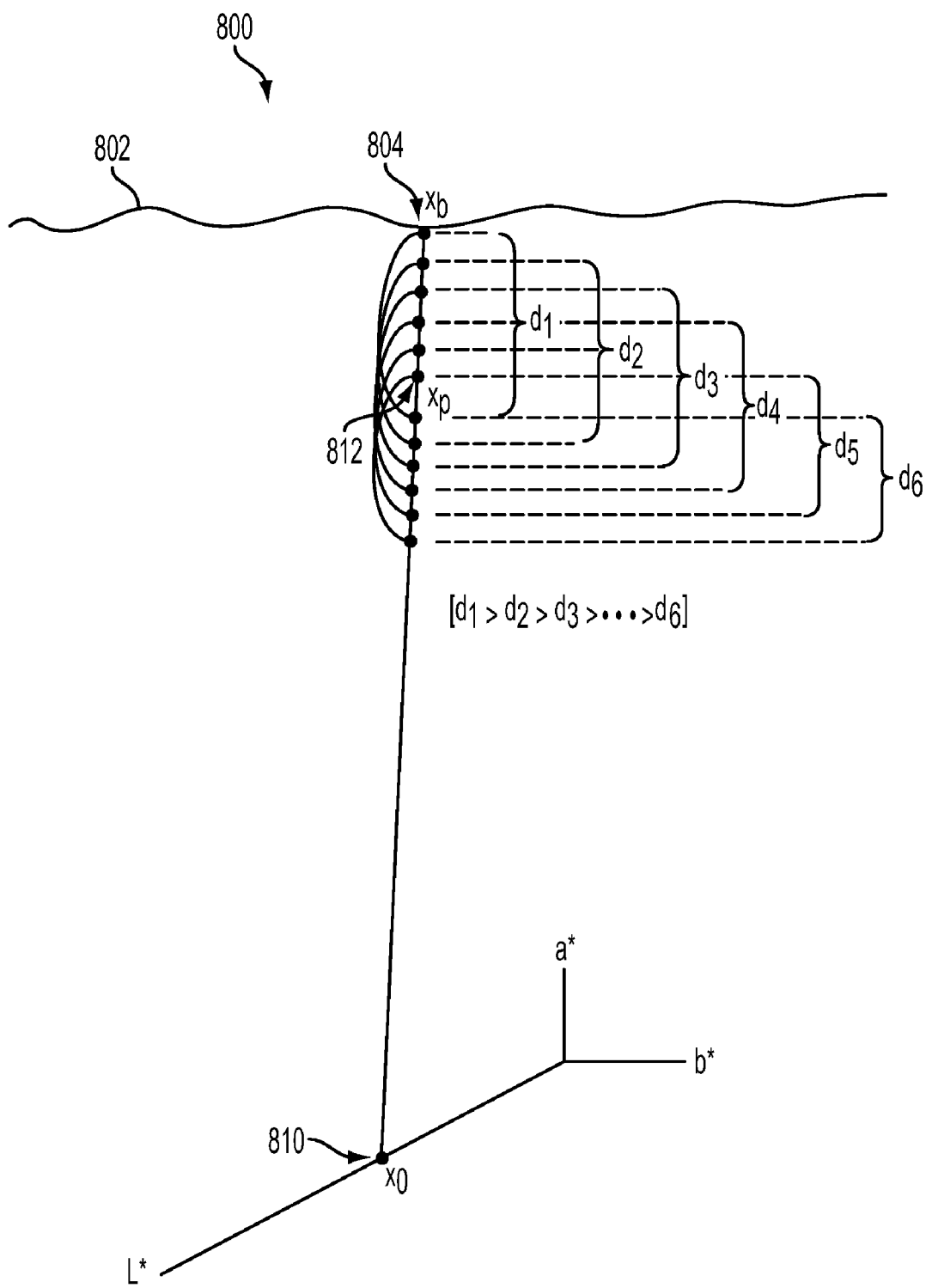
FIG. 10 shows the ray of FIG. 9 with the points between $x_b$ and $x_p$ having been moved a distance down the ray in accordance with the present ray-based compression mapping method.

As shown in FIG. 10, points between $x_b$ and $x_p$ are moved a distance $d_1$, $d_2$, $d_3$, etc, further down along the ray to a location between $x_p$ and $x_0$. Distance $d_1$ is greater than distance $d_2$. Distance $d_2$ is greater than distance $d_3$, and so on. Each point between $x_b$ and $x_p$ is moved a distance along the ray which is less than a distance a previous point between $x_b$ and $x_p$ was moved. Additionally, a point $x_c$ can be identified which is outside the surface boundary of the gamut and points between $x_c$ and $x_b$ are also moved using the piece-wise linear function.

After each point has been moved, at 714, CMYK values are generated for the mapped points. One embodiment uses iterative control techniques known in the arts. Thereafter, the generated CMYK values are provided to an image processing system.

Figure 11:
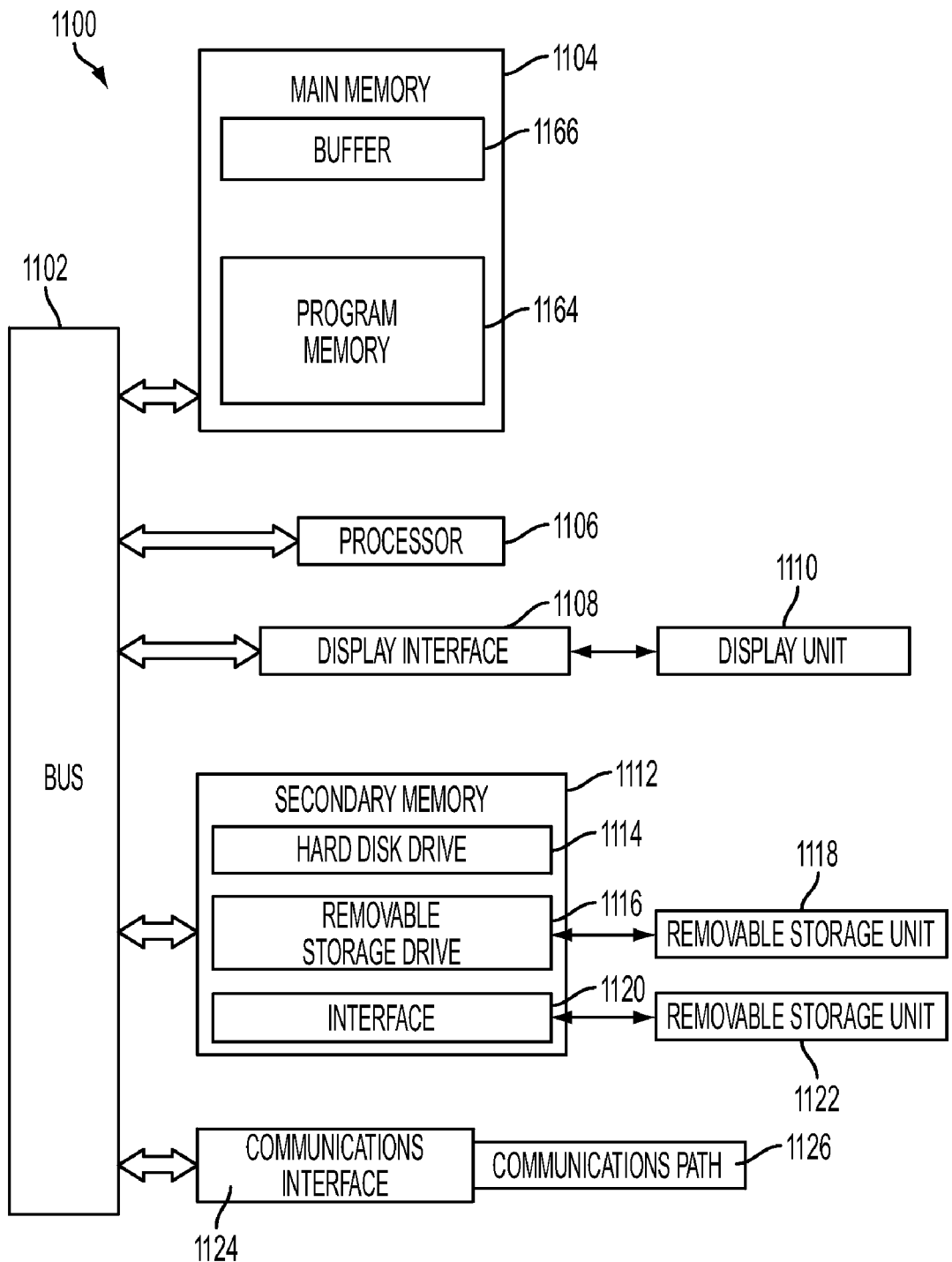
FIG. 11 illustrates a block diagram of one example embodiment of a special purpose computer system useful for implementing one or more aspects of the present image resizing method.

Reference is now made to FIG. 11 which illustrates a block diagram of one example embodiment of a special purpose computer useful for implementing one or more aspects of the present determinative method. Such a system could be implemented as a separate computer system, or as electronic circuit, or in an ASIC, for example. The nature of the exact implementation will depend on the image processing environment wherein the present method finds its intended uses.

Special purpose computer system 1100 includes processor 1106 for executing machine executable program instructions for carrying out all or some of the various aspects of the present method. The processor is in communication with bus 1102. The system includes main memory 1104 for storing machine readable instructions. Main memory may comprise random access memory (RAM) to support reprogramming and flexible data storage. Buffer 1166 stores data addressable by the processor. Program memory 1164 stores program instructions. A display interface 1108 forwards data from bus 1102 to display 1110. Secondary memory 1112 includes a hard disk 1114 and storage device 1116 capable of reading/writing to removable storage unit 1118, such as a floppy disk, magnetic tape, optical disk, etc. Secondary memory 1112 further includes other mechanisms for allowing programs or other machine executable instructions to be loaded into the processor. Such mechanisms may include, for example, a storage unit 1122 adapted to exchange data through interface 1120 which enables the transfer of software and data to the processor. The system includes a communications interface 1124 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1126 which carries such signals and may be implemented using wire, cable, fiber optic, phone line, cellular link, RF, memory, or other means known in the arts.

Figure 12:
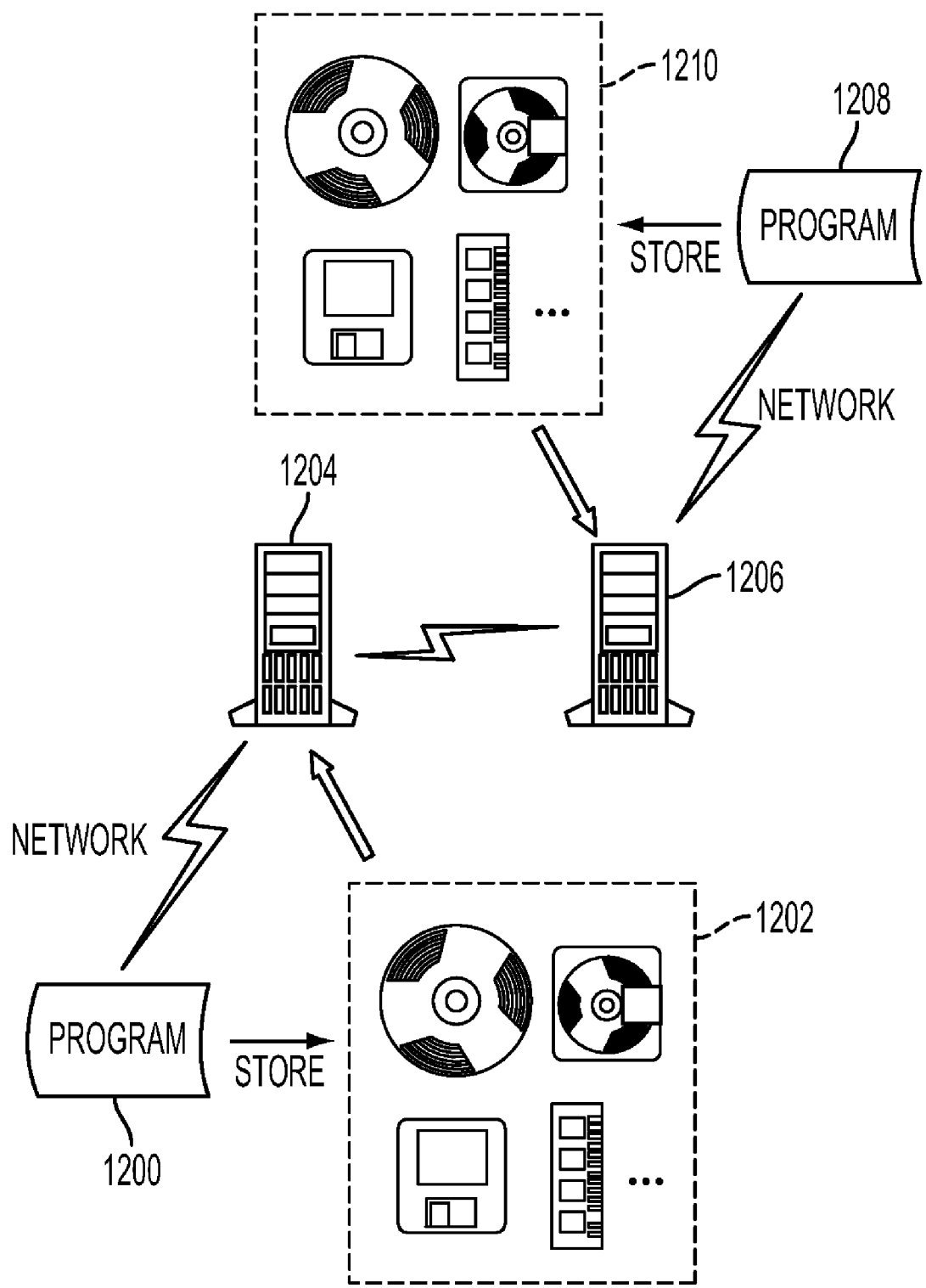
FIG. 12 is an explanatory diagram illustrating one example computer readable medium capable of storing machine readable instructions which, when mounted on a computer or a special purpose computer system, causes the system to perform one or more aspects of the present method.

Reference is now made to FIG. 12 which is an explanatory diagram illustrating one example of a computer readable storage medium capable of storing machine readable instructions which, when mounted on a computer or a special purpose computer system, causes the system to perform one or more aspects of the present method as described above. The machine readable instructions may be modified by one computer and transferred to another computer.

In the illustrated embodiment, one or more computer programs 1200 for carrying out the present method are loaded on a computer-readable storage media 1202 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states or orientations in response to program instructions having been transferred to the media. The computer programs containing machine executable instructions of the present method can then be mounted on computer 1204 and transferred or otherwise communicated to computer 1206. The program instructions can then be off-loaded to another medium 1208, in original form or modified, including data, and stored on storage media 1210. Both of the computer systems include processors capable of executing machine readable program instructions. The processor may be placed in communication with an image scanning device (not shown) for receiving the pixel values directly therefrom.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in, and the like, as are known in the arts. Such an article of manufacture may further be shipped, sold, leased, or otherwise provided either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for ray-based compression mapping in a color management system performing a gamut mapping function, comprising:
    identifying a point $x_b$ in L*a*b* space having $\{L^*_b, a^*_b, b^*_b\}$ values, said point $x_b$ being near a surface boundary of a color gamut;
    identifying a point $x_0$ in L*a*b* space having $\{L^*_0, a^*_0, b^*_0\}$ values, said point $x_0$ being inside said surface boundary of said color gamut;
    tracing a ray between points $x_b$ and $x_0$;
    identifying a point $x_p$ along said ray between $x_b$ and $x_0$ which is a distance from $x_b$, said distance being an amount of compression to be applied to said gamut;
    dividing said ray between $x_b$ and $x_p$ into discrete points, each point having $\{L^*_i, a^*_i, b^*_i\}$ values, where i is an index of point $x_i$; and
    for each of said discrete points starting from $x_b$:
        moving current point $x_i$ to a point along said ray between $x_p$ and $x_0$, each successive point being moved a distance which is less than a distance a previous point was moved.

2. The method of claim 1, further comprising identifying a point $x_c$ having $\{L^*_c, a^*_c, b^*_c\}$ values, said point $x_c$ being outside said surface boundary of said gamut.

3. The method of claim 2, wherein said points are moved using a piece-wise linear function comprising:

$$x = (1-\beta)\left[x_0 + \frac{x_b - x_0}{N}i\right] + \beta\left[x_0 + \frac{x_c - x_0}{N}i\right],$$

for $0 \leq i \leq i_b$, $$x = (1-\beta)\left[x_0 + \frac{x_b - x_0}{N}i\right] + \beta x_b,$$

for $i_b \leq i \leq N$, where i is an index such that, for i=0 to N, i=0 represents point $x_0$ and i=N represents point $x_b$, and where $\beta$ is a compression parameter such that $0 \leq \beta \leq 1$.

4. The method of claim 3, further comprising smoothing said piece-wise linear function using a 1D smoothing algorithm.

5. The method of claim 2, further comprising moving at least one point between $x_c$ and $x_b$ to a point along said ray between $x_p$ and $x_0$.

6. The method of claim 1, further comprising:
    generating CMYK values for each of said moved points; and
    providing said generated CMYK values to an image processing system.

7. The method of claim 6, further comprising assigning CMYK values of said moved points to nearest nodes in a multi-dimensional look-up table.

8. A system for ray-based compression mapping in a color management system performing a gamut mapping function, the system comprising:
    a memory and a storage medium; and
    a processor in communication with said storage medium and said memory, said processor executing machine readable instructions for performing:
        identifying a point $x_b$ in L*a*b* space having $\{L^*_b, a^*_b, b^*_b\}$ values, said point $x_b$ being near a surface boundary of a color gamut;
        identifying a point $x_0$ in L*a*b* space having $\{L^*_0, a^*_0, b^*_0\}$ values, said point $x_0$ being inside said surface boundary of said color gamut;
        tracing a ray between points $x_b$ and $x_0$;
        identifying a point $x_p$ along said ray between $x_b$ and $x_0$ which is a distance from $x_b$, said distance being an amount of compression to be applied to said gamut;
        dividing said ray between $x_b$ and $x_p$ into discrete points, each point having $\{L^*_i, a^*_i, b^*_i\}$ values, where i is an index of point $x_i$; and
        for each of said discrete points starting from $x_b$:
            moving current point $x_i$ to a point along said ray between $x_p$ and $x_0$, each successive point being moved a distance which is less than a distance a previous point was moved.

9. The system of claim 8, further comprising identifying a point $x_c$ having $\{L^*_c, a^*_c, b^*_c\}$ values, said point $x_c$ being outside said surface boundary of said gamut.

10. The system of claim 9, wherein said points are moved using a piece-wise linear function comprising:

$$x = (1-\beta)\left[x_0 + \frac{x_b - x_0}{N}i\right] + \beta\left[x_0 + \frac{x_c - x_0}{N}i\right],$$

for $0 \leq i \leq i_b$, $$x = (1-\beta)\left[x_0 + \frac{x_b - x_0}{N}i\right] + \beta x_b,$$

for $i_b \leq i \leq N$, where i is an index such that, for i=0 to N, i=0 represents point $x_0$ and i=N represents point $x_b$, and where $\beta$ is a compression parameter such that $0 \leq \beta \leq 1$.

11. The system of claim 10, further comprising smoothing said piece-wise linear function using a 1D smoothing algorithm.

12. The system of claim 9, further comprising moving at least one point between $x_c$ and $x_b$ to a point along said ray between $x_p$ and $x_0$.

13. The system of claim 8, further comprising:
generating CMYK values for each of said moved points; and
providing said generated CMYK values to an image processing system.

14. The system of claim 13, further comprising assigning CMYK values of said moved points to nearest nodes in a multi-dimensional look-up table.

15. A computer program product for ray-based compression mapping in a color management system performing a gamut mapping function, the computer program product comprising:
a non-transitory computer readable medium for storing instructions that, when executed on a computer, cause the computer to perform a method comprising:
identifying a point $x_b$ in L*a*b* space having $\{L^*_b, a^*_b, b^*_b\}$ values, said point $x_b$ being near a surface boundary of a color gamut;
identifying a point $x_0$ in L*a*b* space having $\{L^*_0, a^*_0, b^*_0\}$ values, said point $x_0$ being inside said surface boundary of said color gamut;
tracing a ray between points $x_b$ and $x_0$;
identifying a point $x_p$ along said ray between $x_b$ and $x_0$ which is a distance from $x_b$, said distance being an amount of compression to be applied to said gamut;
dividing said ray between $x_b$ and $x_p$ into discrete points, each point having $\{L^*_i, a^*_i, b^*_i\}$ values, where i is an index of point $x_i$; and
for each of said discrete points starting from $x_b$:
moving current point $x_i$ to a point along said ray between $x_p$ and $x_0$, each successive point being moved a distance which is less than a distance a previous point was moved.

16. The computer program product of claim 15, further comprising identifying a point $x_c$ having $\{L^*_c, a^*_c, b^*_c\}$ values, said point $x_c$ being outside said surface boundary of said gamut.

17. The computer program product of claim 16, wherein said points are moved using a piece-wise linear function comprising:

$$x = (1-\beta)\left[x_0 + \frac{x_b - x_0}{N}i\right] + \beta\left[x_0 + \frac{x_c - x_0}{N}i\right], \text{ for } 0 \leq i \leq i_b,$$

$$x = (1-\beta)\left[x_0 + \frac{x_b - x_0}{N}i\right] + \beta x_b, \text{ for } i_b \leq i \leq N,$$

where i is an index such that, for i=0 to N, i=0 represents point $x_0$ and i=N represents point $x_b$, and where $\beta$ is a compression parameter such that $0 \leq \beta \leq 1$.

18. The computer program product of claim 17, further comprising smoothing said piece-wise linear function using a 1D smoothing algorithm.

19. The computer program product of claim 16, further comprising moving at least one point between $x_c$ and $x_b$ to a point along said ray between $x_p$ and $x_0$.

20. The computer program product of claim 15, further comprising:
generating CMYK values for each of said moved points; and
providing said generated CMYK values to an image processing system.

21. The computer program product of claim 15, further comprising assigning CMYK values of said moved points to nearest nodes in a multi-dimensional look-up table.

* * * * *